(12) United States Patent
Davis

(10) Patent No.: US 11,556,458 B2
(45) Date of Patent: Jan. 17, 2023

(54) EFFICIENT FUZZ TESTING OF LOW-LEVEL VIRTUAL DEVICES

(71) Applicant: VMware, Inc., Palo Alto, CA (US)

(72) Inventor: Darius Davis, Westlake (AU)

(73) Assignee: VMware, Inc., Palo Alto, CA (US)

( * ) Notice: Subject to any disclaimer, the term of this patent is extended or adjusted under 35 U.S.C. 154(b) by 227 days.

(21) Appl. No.: 16/523,509

(22) Filed: Jul. 26, 2019

(65) Prior Publication Data

US 2021/0026758 A1 Jan. 28, 2021

(51) Int. Cl.
*G06F 9/46* (2006.01)
*G06F 11/36* (2006.01)
*G06F 9/455* (2018.01)

(52) U.S. Cl.
CPC ...... *G06F 11/3664* (2013.01); *G06F 9/45558* (2013.01); *G06F 11/366* (2013.01); *G06F 11/3636* (2013.01); *G06F 2009/45583* (2013.01); *G06F 2009/45587* (2013.01); *G06F 2009/45591* (2013.01)

(58) Field of Classification Search
CPC .............. G06F 11/3664; G06F 9/45558; G06F 11/3636; G06F 11/366
See application file for complete search history.

(56) References Cited

U.S. PATENT DOCUMENTS

| | | | | |
|---|---|---|---|---|
| 6,212,533 B1 * | 4/2001 | Tabuchi | ................. | G06F 16/94 715/205 |
| 8,347,110 B2 * | 1/2013 | Pelletier | ................ | G06F 21/556 713/189 |
| 8,352,608 B1 * | 1/2013 | Keagy | ................. | G06F 9/45533 709/225 |
| 2011/0219363 A1 * | 9/2011 | Wu | ...................... | G06F 9/44521 717/140 |
| 2011/0289501 A1 * | 11/2011 | Yamasaki | ........... | G06F 12/0875 718/1 |
| 2013/0111308 A1 * | 5/2013 | Sauber | ................ | H03M 13/095 714/799 |
| 2015/0268133 A1 * | 9/2015 | Ranjan | ................ | G06F 11/0736 702/183 |
| 2017/0288874 A1 * | 10/2017 | Narendra Trivedi | ... | G06F 21/57 |

OTHER PUBLICATIONS

Steve G. Langer & Todd French, Virtual Machine Performance Benchmarking, 2011, vol. 24 (5), p. 883-889.*
Li Shi ; Zhemin Zhang ; Robertazzi, Thomas; Energy-Aware Scheduling of Embarrassingly Parallel Jobs and Resource Allocation in Cloud; 2017, vol. 28 (6), p. 1607-1620.*

* cited by examiner

*Primary Examiner* — Camquy Truong
(74) *Attorney, Agent, or Firm* — Clayton, McKay & Bailey, PC

(57) ABSTRACT

Examples described herein include systems and methods for fuzz testing low-level virtual devices and virtual devices with DMA write functionality. A fuzz tester includes components distributed across a virtual machine and its host system. The fuzz testing components in the virtual machine are implemented as firmware installed in the virtual machine's ROM. These components operate independent of data stored in the virtual machine's RAM and do not require an operating system to be installed on the virtual machine. As a result, any changes made to the virtual machine's RAM during the fuzzing process by low-level virtual devices or virtual devices with DMA write functionality cannot interrupt the fuzz testing or otherwise negatively impact the fuzz tester itself.

20 Claims, 5 Drawing Sheets

FIG. 4

400
- 410 — rep  outsb
- 440 — jmp  go

420 — DW WIDTH(1) | DETERMINISTIC | MUTATOR \
422 — IREG_CX_COUNT | IREG_DX_IOPORT | IREG_ESI (TGT_MEM)
430
432
424
426

450
- 460 — repe  cmpsw
- 480 — jmp  go

470 — DW WIDTH(2) | \
472 — IREG_CX_COUNT | IREG_ESI (TGT_MEM) | IREG_EDI (TGT_MMIO)
474
476

172

EFFICIENT FUZZ TESTING OF LOW-LEVEL VIRTUAL DEVICES

BACKGROUND

A key aspect of developing virtual environments on host machines is troubleshooting the virtual devices allocated to the virtual environments to ensure they can handle unexpected inputs safely. In this context, "safely" means that unexpected or malicious inputs transmitted through a virtual environment cannot be used to take control of, crash, or hang the host system.

For example, in a virtual environment, there is a critical security boundary between the virtual machine (or "guest") and the system on which the virtual machine is hosted (the "host"). Code relevant to that security boundary can include the implementation of a plurality of virtual devices. The device emulation code allows the operating system ("OS") installed on the virtual machine, or applications installed on top of that OS, to believe it has particular chipsets, network devices, or sound devices at its disposal even when there is no such device physically present. The code accepts input from the virtual machine in the form of input/output ("I/O") operations, in which the virtual machine believes it is writing data to a virtual device or reading data back from a virtual device. In fact, those I/O operations are handled by the device emulation code. Defects in the emulation code could potentially allow a "VM escape," where malicious inputs to the virtual machine take advantage of a defect in the emulation code to breach the security boundary and take control of the host system or crash the host system.

It is very important then to identify any such defects in the device emulation code prior to allowing users access to virtual devices in a virtual machine. Identifying all possible unexpected inputs to a virtual device is not feasible. So, the primary way in which these defects are identified is through fuzz testing. In this context, fuzz testing or fuzzing is an automated software testing technique that involves providing invalid, unexpected, random, or pseudorandom data as inputs to virtual devices. The virtual devices are then monitored for any condition that could lead to a VM escape or crashing of the host system.

Fuzz testing can be performed by a special-purpose application or driver referred to as a fuzz tester or fuzzer. In practice, after a virtual machine is established on a host system by a hypervisor, an OS will be installed on the virtual machine and the fuzz tester or fuzzer will be installed on top of the OS within the virtual machine. The fuzz tester is configured to iteratively construct operations with random or pseudorandom contents or inputs and transmit them to one or more virtual devices of the virtual machine. Over a period of time, the hope is that any unexpected inputs that may result in a VM escape or other unsafe condition can be identified. At the least, through a series of random inputs transmitted to one or more virtual devices over a period of time, developers can gain a level of confidence that a VM escape or unsafe condition precipitated by an unexpected input to a virtual device is highly unlikely.

However, these types of fuzz testers have limitations. Because traditionally implemented fuzzers are installed on top of an OS of the virtual machine and are dependent on RAM dedicated to the virtual machine, they are not reliable for testing low-level virtual devices. In this context, "low-level" is used to describe devices that are usually in permanent use by the OS and whose configuration is essential for the OS to function normally, such as chipset control registers, input-output memory management unit ("IOMMU") registers, peripheral component interconnect ("PCI") configuration space, interrupt controllers such as peripheral interface controllers ("PIC"), advanced programmable interrupt controllers ("APIC"), and input-output programmable interrupt controllers ("IOAPIC"), timers such as programmable interval timers ("PIT") and high precision event timer ("HPET"), keyboard controllers, direct memory access ("DMA") controllers, and reset ports. For example, fuzz testing an Advanced Programmable Interrupt ("APIC") using a traditional fuzzer would almost certainly crash any operating system when the APIC is provided with randomized input. Another example of a low-level device that cannot be reliably fuzz tested using traditional techniques would be any virtual device "built-in" to the motherboard which, by design, would cause the virtual machine to reset itself or power itself off when provided with randomized input.

Although these situations may not necessarily be characterized as an escape event or "unsafe," they would terminate the ongoing fuzz test by crashing or shutting down the virtual machine and requiring the OS and fuzz tester to be re-installed or re-booted, along with any other applications and drivers in the virtual environment.

Traditional fuzz testers are also not well-suited for troubleshooting any virtual devices which perform DMA writes. DMA writes can potentially overwrite arbitrary areas of RAM. So a traditional fuzzer operating on top of an OS of a virtual machine could cause a virtual device that performs DMA writes to overwrite areas of the virtual machine RAM. When critical OS code or data is overwritten, or when code associated with the fuzz tester itself is overwritten, serious stability issues result. As described above with respect to low-level devices, these situations can also terminate an ongoing fuzz test and require the virtual machine, its OS, or the fuzz tester application to be re-installed or re-booted, along with any other applications or drivers in the virtual environment.

Because fuzz testing is difficult in these situations, fuzzing is rarely used to troubleshoot low-level devices or devices with DMA functionality. As a result, defects in these devices can go undetected. A need exists, therefore, for systems and methods that allow developers of virtual machines to fuzz test low-level devices and devices with DMA functionality without the risks and inefficiencies associated with re-installing or rebooting a virtual machine OS, a fuzz tester, or other associated applications and drivers.

SUMMARY

Examples described herein include systems and methods for fuzz testing low-level virtual devices. An example system includes a fuzz tester divided into two components, one component residing in a virtual machine and one component residing in the hypervisor of the host system. Migrating much of the fuzz tester functionality out of the virtual machine allows the portion of the fuzz tester present in the virtual machine to be installed as firmware on the virtual machine's ROM. In this way, the fuzzer firmware not only requires no guest OS to be installed on the virtual machine, but the firmware can operate independent of the virtual machine's allocated RAM. As a result, changes to the guest RAM that would normally destabilize the virtual machine's OS or the fuzz tester itself cannot crash the virtual machine or otherwise negatively impact the fuzz testing process.

In some examples, the fuzzing process can begin by initializing the fuzzer firmware on the virtual machine. Once initialized, the firmware can then request an operation from a fuzzer control located in the hypervisor of the host system. Based at least in part on a list of available operations and information pertaining to each operation's parameters, the fuzzer control can select and populate an operation with the help of a pseudorandom number generator that also resides in the hypervisor.

After constructing the operation, the fuzzer control can then transmit the operation to the fuzzer firmware in the virtual machine and the firmware can execute the operation against one or more virtual devices. Upon execution, the firmware can then request another operation from the fuzzer control in the hypervisor and the process repeats for the duration of the fuzz test.

Because the only active component in the virtual machine is the fuzzer firmware, which operates independent of the virtual machine's RAM, any changes made to the virtual machine's RAM during the fuzz test by low-level virtual devices or virtual devices with DMA write capability will not interrupt the fuzz test or impact the fuzzer firmware in any way.

The examples summarized above can also be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 4 is an example of an operation table associated with a fuzz tester configured for fuzz testing virtual devices.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
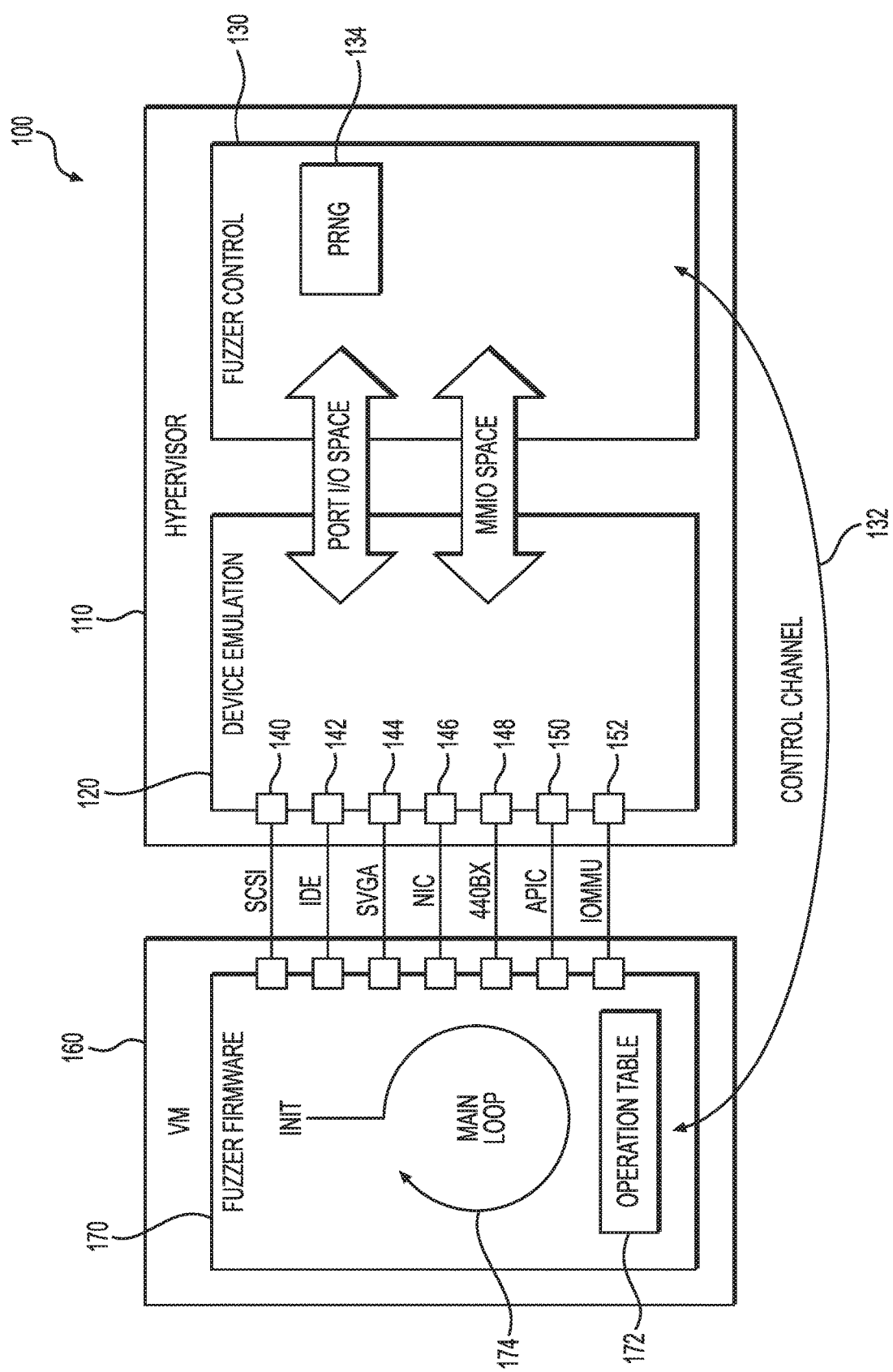
FIG. 1 is an example system for fuzz testing virtual devices.
Figure 2:
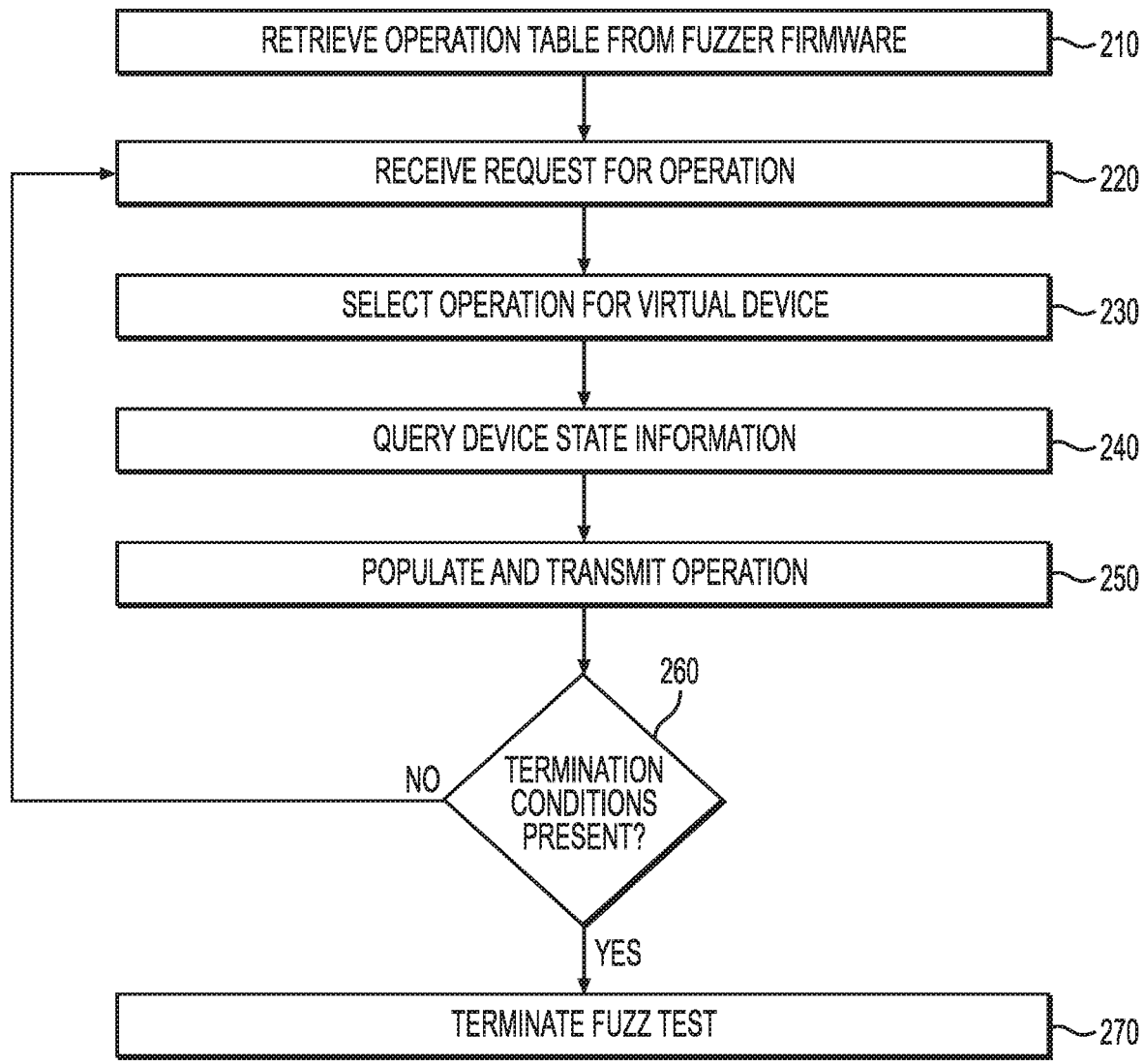
FIG. 2 is a flowchart of an example method for fuzz testing virtual devices.
Figure 3:
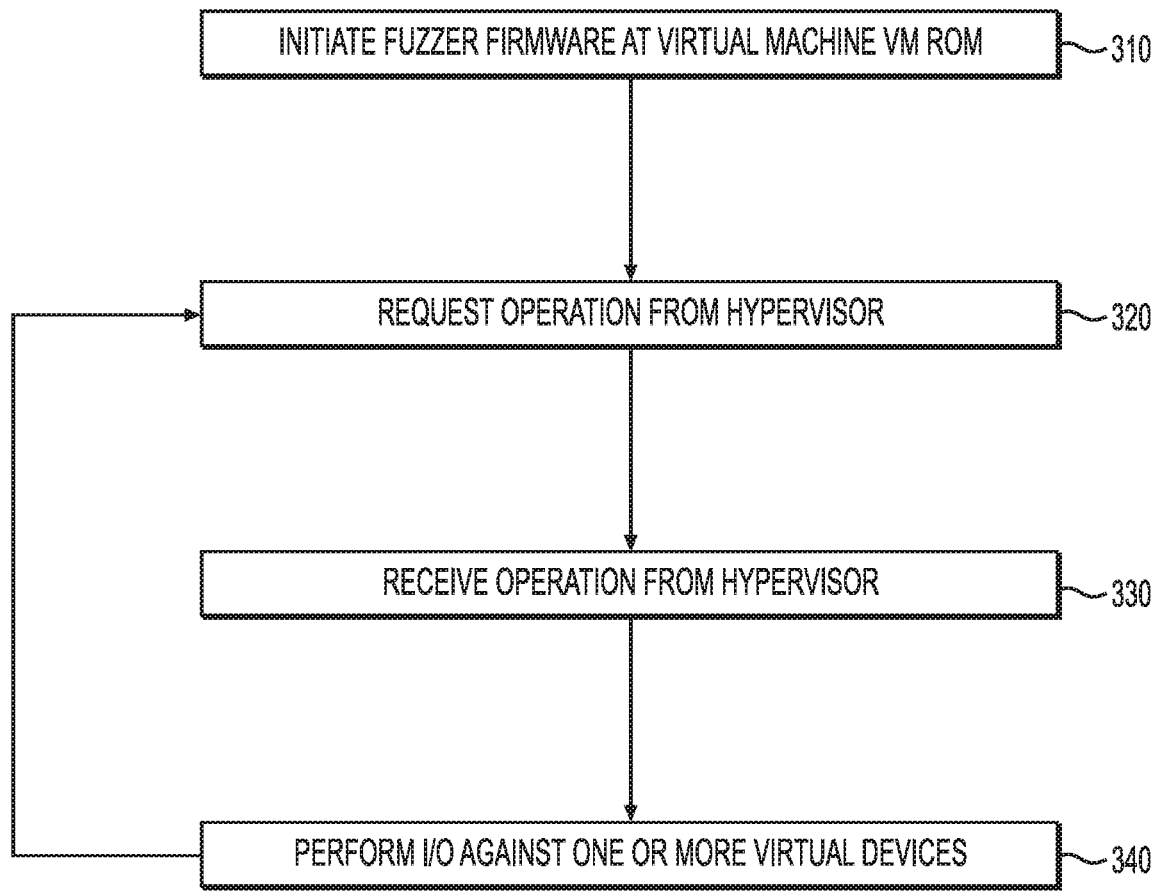
FIG. 3 is a flowchart of an example method for fuzz testing virtual devices.
Figure 5:
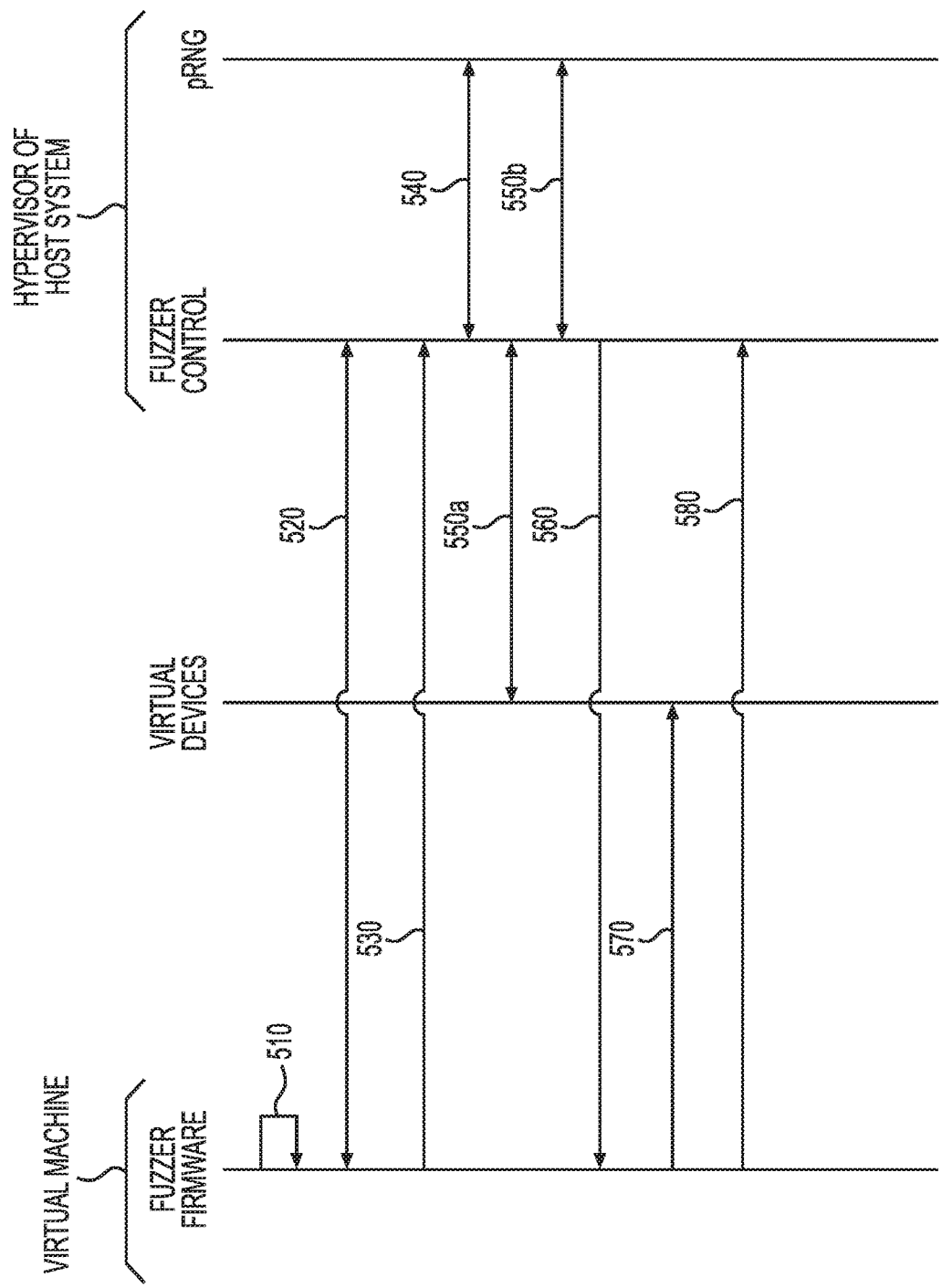
FIG. 5 is a sequence diagram of an example method for fuzz testing virtual devices.

FIG. 1 provides an example system for fuzz testing virtual devices, including low-level virtual devices and virtual devices with DMA write functionality. FIGS. 2 and 3 provide a flowchart of example methods for fuzz testing virtual devices. FIG. 4 provides an example operation table associated with a fuzz tester operating on a virtual machine. FIG. 5 provides a sequence diagram of example methods for fuzz testing virtual devices.

Turning to FIG. 1, a host system 100 for fuzz testing virtual devices is shown. System 100 can include multiple servers, processors, and computing devices. In some examples, system 100 is a network of servers, some of which can be located remotely from one another. In another example, system 100 is a single server. In yet another example, system 100 is a server (or group of servers) dedicated to the operations described herein. The host system 100 includes a hypervisor 110 and a virtual machine 160, in some examples. The hypervisor 110 is software installed on the host system 100 that enables virtualization and establishes virtual machines, including virtual machine 160.

The hypervisor 110 can be either a Type 1 "bare metal" hypervisor or a Type 2 "hosted" hypervisor. A bare metal hypervisor (e.g., VMWARE ESXi®) has its own OS and can be installed directly on the hardware of the host system 100. A hosted hypervisor (e.g., VMWARE WORKSTATION®) is a software application that is installed on top of an OS of the host system 100.

In either case, the hypervisor 110 creates the virtualization layer on the host system 100 and serves as a platform for creating virtual machines. Though only virtual machine 160 is shown in FIG. 1, in other examples, the hypervisor 110 can create a plurality of virtual machines within the host system 100. The hypervisor 110 also manages the sharing of the host's physical resources among the created virtual machines.

As part of establishing the virtual machine 160, for example, the hypervisor 110 allocates an area of the host system's RAM to the virtual machine 160 which functionally serves as the virtual machine's ROM and RAM. The hypervisor 110 can also emulate a plurality of hardware components for use by the virtual machine 160. For example, hypervisor 110 can include device emulation code 120 that establishes and configures virtual devices such as small computer system interface ("SCSI") 140, integrated device electronics ("IDE") 142, super video graphics array ("SVGA") 144, network interface controller ("NIC") 146, virtual chipsets (e.g., INTEL 440BX) 148, advanced programmable interrupt controller ("APIC") 150, and input-output memory management unit ("IOMMU") 152. From the perspective of the virtual machine 160, it is an independent computing system, including devices 140-152 and with its own ROM and RAM. For clarity, virtual devices 140-152 listed above are only examples of potential emulated devices and the device emulation code 120 can be used to configure alternative or additional virtual devices not depicted in FIG. 1.

I/O operations can be performed on each virtual device using memory-mapped I/O ("MMIO") space, in some cases, or port I/O space in others. When using MMIO space, each virtual device is associated with a unique location in guest RAM and it can be mapped to anywhere within a predetermined address space. In this way, read or write operations used to access RAM can be used to access the virtual devices. In use, each virtual device monitors the virtual machine 160's address bus and responds to any transmitted data that includes an address assigned to that device. Write operations can change the location of a device in memory or can be used to otherwise configure the device. To facilitate these communications, areas of address space must be reserved for the virtual devices rather than for normal system RAM. On the other hand, some devices do not use any MMIO space and are not allocated addresses in the regular address space. Such devices may only use port-mapped I/O space.

System 100 also includes a fuzz tester. Unlike traditional systems in which a fuzzer is implemented as an application or driver that runs on top of an OS installed on a virtual machine, the fuzzer depicted in FIG. 1 includes two components split across the virtual and host environments: a fuzzer firmware (or fuzzer module) 170 and a fuzzer control 130. The fuzzer firmware 170 is located on the virtual machine 160 and the fuzzer control 130 is located on the hypervisor 110 of the host system 100, in some examples. The fuzzer components 170 and 130 can communicate with one another through a control channel 132.

The fuzzer control 130 can determine fuzzing operations to be executed by the fuzzer firmware 170. Upon initiation of a fuzz test, in some examples, the fuzzer control 130 can query one or more of the virtual devices 140-152 for state information. For example, the fuzzer control 130 can query the lists of in-use MMIO space and port-mapped I/O space associated with the virtual devices 140-152 that is maintained in the device emulation 120.

At initiation, fuzzer control 130 can also retrieve an operation table 172 (or any other suitable data structure) embedded in the fuzzer firmware 170's ROM over the control channel 132. The operation table 172 contains a list of fuzzing operations that the firmware 170 is configured to perform on the virtual devices and one or more attributes associated with each operation. For example, the operation table 172 can include entries for one or more virtual devices 140-152 describing discrete Memory-Mapped JO ("MMIO") read or write, MMIO string read or write, discrete I/O read or write, and I/O string read or write, in byte, word, or doubleword widths. The table entry for each operation can specify a list of CPU registers to be populated with either an I/O port address, an MMIO address, an address of a RAM buffer, a repeat count, or an immediate value to be used during a write operation. Each operation, once populated with data, can be used to configure one or more virtual devices 140-152. Additional details regarding the operation table 172 are provided below with respect to FIG. 4.

The fuzzer control 130 can also include a pseudorandom number generator 134. A pseudorandom number generator is an algorithm for generating a sequence of numbers whose properties approximate the properties of sequences of random numbers. In some examples, the generated sequence is not truly random because the sequence is based on an initial value or "seed" value. In alternative embodiments, rather than using a pseudorandom number generator, a file containing random data could be employed.

As shown in FIG. 1, the pseudorandom number generator can be used to generate pseudorandom input data for populating operation parameters to be included in fuzzing operations that are then sent to the fuzzer firmware 170. In these examples, after the fuzzer control 130 selects an operation based at least in part on the operation table 172 and populates that operation based at least in part on data received from the pseudorandom number generator 134, the fuzzer control 130 sends the operation to the fuzzer firmware 170 over the control channel 132. The fuzzer firmware 170 then executes the operation, in some examples, by performing read or write I/O against one or more of the virtual devices 140-152 according to the parameters provided by the fuzzer control 130, which include the psuedorandomly generated data. After executing the operation, the fuzzer firmware 170 can then notify the fuzzer control 130 that it is ready for another operation.

Prior to, or concurrent with, generating a next operation, fuzzer control 130 can query one or more virtual devices 140-152 (e.g., query the lists of in-use MMIO space and port-mapped I/O space) impacted by execution of the previous operation and receive updated state information pertaining to the affected devices 140-152. More details regarding the fuzzing process are provided below with respect to other figures.

The fuzzer firmware 170, instead of being installed as an application or driver that would be dependent on the virtual machine 160's OS or apportioned RAM, can be implemented as firmware installed directly on the ROM apportioned to the virtual machine 160. For example, the fuzzer firmware 170 can be a lightweight fuzzer "stub" designed for execution directly from the virtual machine 160's ROM space with little or no dependency on apportioned RAM. In some examples, the fuzzer firmware 170 is the only component which runs inside the virtual machine 160 and no guest OS is necessary. In alternative embodiments, the virtual machine 160 can include an OS, but because the fuzzer firmware 170 is still a ROM-based stub, its functionality is not dependent on the guest OS. In either case, the fuzzer firmware 170 is designed to perform minimal system initialization before entering a repeating loop 174 in which it requests its next fuzzer operation from the fuzzer control 130, executes it, and requests another operation.

Because the fuzzer firmware 170 operates independent of a guest OS or the RAM apportioned to the virtual machine 160, any changes to the guest OS (if one is installed on the VM 160) or guest RAM that are made by low-level devices or resulting from a DMA write cannot negatively impact the functionality of the fuzzer firmware 170 or the fuzzing process. In this way, low-level devices and devices with DMA write functionality can be fuzz tested without the risk of repeatedly crashing the virtual machine 160. The lightweight build of the fuzzer firmware 170 and independence from any guest OS also results in reduced boot times, disk space requirements, and memory consumption compared to traditional fuzzers, in some examples. As a result, even if an unexpected input to a virtual device 140-152 does manage to crash the virtual machine 160, the machine 160 can be rebooted and fuzzing can be resumed far faster than in systems employing traditional fuzzers and techniques.

FIG. 2 depicts a flowchart of an example method for fuzz testing virtual devices from the perspective of the fuzzer control 130. Upon initialization of the fuzzing process, at step 210, the fuzzer control 130 can retrieve a copy of the operation table 172 stored in fuzzer firmware 170. As discussed above, the operation table 172 includes a list of operations that the fuzzer firmware 170 is configured to perform, as well as information regarding parameters to be included in each operation.

At step 220, a request for an operation to be performed against the virtual devices 140-152 is received from the fuzzer firmware 170. And at step 230, the fuzzer control 130 uses the pseudorandom number generator 134 to select an I/O operation from the list of available operations in the operation table 172.

Next, in cases where the selected operation requires selection of random (or pseudorandom) MMIO space or port-mapped I/O space, the fuzzer control 130 can query the lists of in-use space at step 240. In some examples, when an I/O port address is needed, the queried port-mapped I/O space information can be consulted to ensure that an in-use I/O port is selected. Likewise, when an MMIO address is needed, the queried MMIO space information can be consulted to ensure that an address is selected from a range of in-use MMIO space.

At step 250, based at least in part on the queried state information and information associated with the selected operation from the operation table 172, the pseudorandom number generator 134 is used to populate CPU registers corresponding to each of the parameters for the selected operation. In this way, the pseudorandom data will dictate which of the virtual devices 140-152 the operation is to be performed against and other aspects of the operation to be performed at the device(s) 140-152. For example, the pseudorandom number generator 134 can provide any required operands and addresses, and for string operations, the direction flag may be randomly set or cleared.

To facilitate deterministic or quasi-deterministic fuzz testing, by default at fuzz testing initiation, a pseudorandom number generator seed is chosen at power-on and stored in host RAM, in some examples. Alternatively, the pseudorandom number generator seed can be set in a configuration file. In either case, the seed information can be used to replay or recreate an earlier fuzz test.

After the operation is generated and populated with data, the fuzzer control 130 can transmit the operation to the fuzzer firmware 170 through the control channel 132. In some examples, the fuzzer control 130 will receive an indication that the operation has been performed by the fuzzer firmware 170 when the fuzzer firmware 170 sends the fuzzer control 130 a request for the next fuzzing operation. Upon receipt of the request, the process shown in FIG. 2 can then repeat itself starting at step 220.

In some examples, before looping back to step 220, the fuzzer control 130 can determine if any conditions are present to terminate the fuzz test at step 260. For example, the fuzzer control 130 can determine whether a predetermined duration of fuzz testing has elapsed or whether a count of operations performed has met a predetermined threshold.

If any such conditions are present, the fuzzer control 130 can terminate the fuzz test at step 270. If such conditions are not present, the fuzz testing continues by returning to step 220 of the process, in some examples, and another operation is generated by the fuzzer control 130.

FIG. 3 depicts a flowchart of an example method for fuzz testing virtual devices from the perspective of the fuzzer firmware 170. As described above, the fuzzer firmware 170 can be the only component which runs inside the virtual machine 160, in some examples. The firmware 170 is a "stub" designed to perform minimal system initialization and then enter a loop in which it requests a fuzzing operation from the fuzzer control 130, executes the operation against one or more of the virtual devices 140-152, and requests the next operation.

At step 310, fuzz testing is initiated by executing the fuzzer firmware 170 installed on the virtual machine 160's ROM. The fuzzing loop can then begin, at step 320, by requesting an I/O operation from the fuzzer control 130 of the host system 100 through control channel 132.

In some examples, the operation is generated by the fuzzer control 130 according to the methods described above with respect to FIG. 2. The operation is then received from the fuzzer control 130 at step 330 and fuzzer firmware 170 can execute the operation against one or more of the virtual devices 140-152 at step 340. In some examples, steps 320, 330, and 340 are repeated in a loop until the fuzz testing is terminated. In the event the virtual machine 160 crashes or hangs as a result of the fuzz testing, the process can restart at step 310 by rebooting the virtual machine and re-executing the fuzzer firmware 170 initiation.

As discussed previously, the fuzzer firmware 170 can operate independent of the virtual machine 160's RAM, such that changes to that RAM resulting from operations performed against the virtual devices 140-152 cannot destabilize or otherwise impact the fuzzer firmware 170. In order to avoid use of RAM, critical CPU data structures can be stored in the virtual machine 160's ROM. In some examples, in addition to the code implementing the fuzzer stub, the firmware image can be constructed to include tables identity-mapping the address space. The tables, in further examples, can also include other information that helps the hypervisor 110 manage and monitor activity within the virtual machine 160, such as a global descriptor table ("GDT"), an interrupt descriptor table ("IDT"), a root virtual machine control structure ("VMCS"), entry points for the boot CPU, identification of auxiliary processors, and the previously discussed table of fuzzer operations 172.

An excerpt from an example of the fuzzer operation table 172 is shown in FIG. 4. As discussed previously, the operation table 172 includes a list of operations that can be executed by the fuzzer firmware 170 against the virtual devices 140-152. In addition to the list of operations, the operation table 172 can include information about one or more parameter fields to be populated for each operation. The operation table 172 can be embedded in the fuzzer firmware 170, in some examples.

After initiation, the fuzzer firmware 170 requests an I/O operation from the fuzzer control 130. In some examples, either at initiation or upon receiving the request, the fuzzer control 130 retrieves a copy of the operation table 172 and stores the table in the host RAM for consultation during the fuzzing process.

FIG. 4 shows a first operation 400 contained in an excerpt of the operation table 172. The example shown is for an 80x86 ("x86") INTEL architecture though other operation tables suitable for use with other processor and system architectures can be used in a similar manner. The first operation 400 can include a first instruction 410. In this example, instruction 410 is an instruction to implement an operation called "rep outsb." The operation table 172 also contains parameter information upon which the fuzzer control 130 (and pseudorandom number generator 132) can rely in populating the first operation 400. For example, parameters associated with the first operation 400 include width information 420, repeat count information 422, I/O port address information 424, source memory information 426, and one or more flags including a first flag 430 indicating whether the operation is deterministic and a second flag 432 indicating whether the operation is likely to change or "mutate" the state of the respective virtual device 160.

In this example, the first operation 400 has a one-byte width, indicated by the width information 420, such that the operation will read or write one byte of data or will work in increments of one byte at a time. Additionally, the operation requires a repeat count in the cx register, an I/O port address in the dx register, and a source memory (RAM) address in the esi register, as indicated by the repeat count information 422, the I/O port address information 424, and the source memory information 426, respectively.

Flag 430 indicates that the first operation 400 is deterministic such that its execution involves minimal or no risk of introducing non-deterministic behavior or data to the virtual machine 160. Flag 432 indicates that the first operation 400 will likely change the state of the virtual device 160 upon which the operation is executed.

The flags 430, 432 are used by the fuzzer control 130 and pseudorandom number generator 132 in selecting which operations to transmit to the fuzzer firmware 170. For example, if the fuzz test is running in a "deterministic" mode, a setting which can be set by a user, the fuzzer control 130 and pseudorandom number generator 132 will only choose from operations within the operation table 172 with the "deterministic" flag 430 set. By limiting selection of operations to these operations carrying the "deterministic" flag, the chance of incorporating non-deterministic data into the current fuzz test is minimized. This may be desirable when troubleshooting a virtual machine 160 because the presence of non-deterministic events can make it unlikely that the fuzzer will be able to reproduce a failure condition when re-run with the same pseudorandom number seed.

Regarding flag 432, the fuzzer control 130 and pseudorandom number generator 132 can also be biased towards selecting operations carrying the "mutator" flag. Non-mutating operations may have code coverage value, but mutating operations are more valuable because they are the operations that will ensure broader coverage of device states.

As shown in FIG. 4, the first operation 400 can also contain a second instruction 440 called "jmp go." This instruction 440 tells the fuzzer firmware 170 to return execution to the top of the fuzzer firmware's 170 loop after executing the operation against the virtual device(s) 140-152 specified in the operation.

The excerpt from the example operation table 172 also depicts a second operation 450. Like the first operation 400, the second operation 450 includes a first instruction 460. The first instruction 460, in this example, is an instruction to implement an operation called "repe cmpsw," which is a string-comparison operation. The operation table 172 also contains parameter information associated with the second operation 450, including width information 470, repeat count information 472, RAM address information 474, and MMIO information 476.

In this example, the second operation 450 operates in 16-bit increments ("WIDTH(2)") with an upper bound on the number of comparisons it will perform ("IREG_CX_COUNT"). The operation will also be configured to compare RAM memory ("TGT_MEM") against some device MMIO space ("TGT_MMIO").

Because the operation 450, in this example, lacks a "deterministic" flag, it cannot be guaranteed that the operation will not read from some non-deterministic MMIO source. This could make repeating the fuzz testing results difficult during subsequent troubleshooting. Similarly, the operation 450 lacks a "mutator" flag. The lack of a "mutator" flag indicates that this particular operation is not intended to change device state as, in this case, the operation should only perform reads as it performs a comparison. Operation 450 also includes a second instruction 480 called "jmp go," which can instruct the fuzzer firmware 170 to return execution to the top of the fuzzer firmware's 170 loop after executing the operation against the virtual device(s) 140-152 specified in the operation.

Though not shown in FIG. 4, the excerpt from the operation table 172 can include additional or alternative operations and parameters suitable for execution by the fuzzer firmware 170 against the virtual devices 140-152.

FIG. 5 depicts a sequence diagram of an example method for fuzz testing virtual devices. At stage 510, the fuzzing process begins by initializing the fuzzer firmware 170 from the virtual machine 160's ROM. At stage 520, the fuzzer firmware can initiate the control channel 132. As part of this stage, the fuzzer control can retrieve a copy of the operation table 172 from the fuzzer firmware 170.

Once initialized, at stage 530, the fuzzer firmware 170 transmits a request to fuzzer controller 130 in hypervisor 110 of the host system 100 for an operation to execute against one or more of the virtual devices 140-152.

Using the operation table 172, and any settings configured by a user such as indications that the fuzz test should be biased toward deterministic or mutating operations, the fuzzer control 130 requests and receives output from the pseudorandom number generator 134 to first select an operation at stage 540.

After determining an operation to execute, the fuzzer control 130 can consult the operation table 172 to determine what parameters, areas of memory, and data types are needed to populate the remainder of the operation. The information needed to populate the operation is discussed in more detail above with respect to FIG. 4.

After determining the various parameters in need of populating, the fuzzer control 130 can, at stage 550a, query device state information (as described previously) in cases where the selected operation requires in-use MMIO space or port-mapped I/O space information. Regardless of whether this information is needed, at stage 550b, the fuzzer control 130 can request and receive suitable output from the pseudorandom number generator 134 to fully populate the operation.

At stage 560, the fuzzer control 130 can transmit the operation to the fuzzer firmware 170 of the virtual machine 160 through control channel 132. The fuzzer firmware 170 can then execute the operation against one or more virtual devices 140-152 at stage 570.

After executing the operation, at stage 580, the fuzzer firmware 170 can then request another operation to perform from the fuzzer control 130. The process of selecting and populating an operation can be repeated by the fuzzer control 130 and the pseudorandom number generator 134 in accordance with stages 540, 550a, and 550b, described above. In each iteration, the selection of the next operation can be based, at least in part, on the most recent updated state information. The process of transmitting the new operation from the fuzzer control 130 to the fuzzer firmware 170, executing the operation by the fuzzer firmware 170 against the virtual devices 140-152, and requesting another operation by the fuzzer firmware 170 are then similarly repeated in accordance with stages 560, 570, and 580 described above.

This process of requesting another operation by the fuzzer firmware 170, populating an operation by the fuzzer control 130, and executing the operation against the virtual devices 140-152 can be cyclically repeated until a VM escape event is detected, the host system crashes or hangs, the virtual machine crashes or hangs, or the fuzz test reaches a natural conclusion based on a time elapsed, a number of operations performed, or some other predetermined event.

In accordance with the examples presented here, low-level virtual devices and virtual devices with DMA write functionality can be fuzz tested efficiently and without repeatedly crashing a virtual machine. The described systems methods split the components of the fuzz tester across the virtual machine and the host system's hypervisor, allowing the portions of the fuzz tester present on the virtual machine to reside in the guest ROM. Because the portions of the fuzz tester on the virtual machine do not rely on a guest OS and are independent of guest RAM, any changes made to the guest OS or RAM resulting from fuzz testing low-level devices and devices with DMA write functionality cannot interrupt or negatively impact the fuzzing process.

The lightweight build and minimal initialization required by the fuzzer firmware allow it to boot within milliseconds. In the event the fuzzing process triggers a system reset of the virtual machine, the guest system can rapidly reboot and resume the fuzzing process. If the fuzzing process were to trigger a system shutdown of the virtual machine, a wrapper script can quickly power the virtual machine back on and the fuzzing process can automatically resume operation.

Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as illustrative only, with a true scope and spirit of the disclosure being indicated by the following claims.

What is claimed is:

1. A method for fuzz testing virtual devices, the method including:
    determining, at a hypervisor located on a host system, a first operation to be performed against one or more virtual devices;
    populating, at the hypervisor, one or more parameters of the first operation using a random or pseudorandom input generator;
    transmitting the first operation and the populated parameters to a fuzzer module located on a virtual machine hosted by the host system, the fuzzer module configured as firmware on the virtual machine operating independent of the virtual machine's random access memory (RAM);
    executing the first operation, by the fuzzer module, against the one or more virtual devices using the populated parameters; and
    sending a request, by the fuzzer module, to the hypervisor for a second operation to be performed against the one or more virtual devices,
    wherein an operation table is embedded in the fuzzer module, the operation table including a plurality of operations available to execute against the one or more virtual devices.

2. The method of claim 1, wherein the random or pseudorandom input generator is used by the hypervisor for selecting the first operation from a plurality of operations.

3. The method of claim 1, wherein the random or pseudorandom input generator is a pseudorandom input generator.

4. The method of claim 1, further including, after execution of the first operation by the fuzzer module:
    querying, by the hypervisor, in-use space associated with the one or more virtual devices to obtain updated state information associated with the one or more virtual devices.

5. The method of claim 4, further including:
    determining, at the hypervisor, the second operation based at least in part on the updated state information.

6. The method of claim 1, further including, before determining the first operation:
    receiving, at the hypervisor, a copy of the operation table embedded in the fuzzer module; and
    storing the copy of the operation table in RAM outside the virtual machine.

7. The method of claim 6, wherein determining the first operation is based at least in part on the copy of the operation table.

8. A non-transitory, computer-readable medium including instructions that, when executed by a processor, performs stages for fuzz testing virtual devices, the stages including:
    initializing fuzzer firmware in a virtual machine that operates independent of the virtual machine's random access memory (RAM);
    transmitting a request for an operation from the fuzzer firmware to a hypervisor located at a host system outside the virtual machine;
    receiving, at the fuzzer firmware, the operation from the hypervisor, the operation being associated with one or more virtual devices and including one or more parameters populated using a random or pseudorandom input generator at the hypervisor;
    executing the operation, including the populated parameters, by the fuzzer firmware against the one or more virtual devices; and
    transmitting a request for another operation from the fuzzer firmware to the hypervisor,
    wherein an operation table is embedded in the fuzzer firmware, the operation table including a plurality of operations available to execute against the one or more virtual devices.

9. The non-transitory, computer-readable medium of claim 8, wherein the fuzzer firmware is implemented in the virtual machine's ROM.

10. The non-transitory, computer-readable medium of claim 9, wherein no operating system is installed on the virtual machine.

11. The non-transitory, computer-readable medium of claim 8, further including: transmitting a copy of the operation table from the fuzzer firmware to the hypervisor.

12. The non-transitory, computer-readable medium of claim 8, wherein the operation received from the hypervisor by the fuzzer firmware is one of the available operations included in the operation table.

13. A host system for fuzz testing virtual devices, the system including:
    a memory storage including a non-transitory, computer-readable medium including instructions; and
    a computing device including a processor that executes the instructions to carry out stages including:
        determining, at a hypervisor located on the host system, a first operation to be performed against one or more virtual devices;
        populating, at the hypervisor, one or more parameters of the first operation using a random or pseudorandom input generator;
        transmitting the first operation and the populated parameters to a fuzzer module located on a virtual machine hosted by the host system, the fuzzer module configured as firmware on the virtual machine operating independent of the virtual machine's RAM;
        executing the first operation, by the fuzzer module, against the one or more virtual devices using the populated parameters; and
        sending a request, by the fuzzer module, to the hypervisor for a second operation to be performed against the one or more virtual devices,
    wherein an operation table is embedded in the fuzzer module, the operation table including a plurality of operations available to execute against the one or more virtual devices.

14. The system of claim 13, wherein the hypervisor includes a file containing random data for selecting the first operation from a plurality of operations.

15. The system of claim 13, wherein the random or pseudorandom input generator includes a file containing random data for populating portions of the first operation.

16. The system of claim 13, wherein no operating system is installed on the virtual machine.

17. The system of claim 13, wherein the first operation is a read or write I/O operation.

18. The non-transitory, computer-readable medium of claim 8, further including, after execution of the first operation by the fuzzer firmware:
   querying, by the hypervisor, in-use space associated with the one or more virtual devices to obtain updated state information associated with the one or more virtual devices.

19. The non-transitory, computer-readable medium of claim 18, further including:
   determining, at the hypervisor, the another operation based at least in part on the updated state information.

20. The system of claim 13, further including:
   receiving, at the hypervisor, a copy of the operation table embedded in the fuzzer module; and
   storing the copy of the operation table in RAM outside the virtual machine.

\* \* \* \* \*